United States Patent
Zhu et al.

(10) Patent No.: US 9,179,283 B2
(45) Date of Patent: Nov. 3, 2015

(54) RESOURCE-BASED BILLING AND MONITORING FOR M2M

(71) Applicant: Cellco Partnership, Basking Ridge, NJ (US)

(72) Inventors: Lily Zhu, Parsippany, NJ (US); Christopher M. Schmidt, Branchburg, NJ (US); Samir S. Vaidya, Highland Park, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 205 days.

(21) Appl. No.: 13/954,164

(22) Filed: Jul. 30, 2013

(65) Prior Publication Data

US 2015/0038110 A1    Feb. 5, 2015

(51) Int. Cl.
| | | |
|---|---|---|
| *H04M 11/00* | (2006.01) | |
| *H04W 4/26* | (2009.01) | |
| *H04L 12/24* | (2006.01) | |
| *H04L 12/14* | (2006.01) | |

(52) U.S. Cl.
CPC ............. *H04W 4/26* (2013.01); *H04L 12/1435* (2013.01); *H04L 12/1457* (2013.01); *H04L 41/5029* (2013.01)

(58) Field of Classification Search
CPC ........... H04W 4/24; H04W 4/26; H04W 4/18; H04W 84/042; H04W 88/18; H04M 15/24; H04M 15/39; H04L 12/1467; H04L 63/0853

USPC ........... 455/552.1, 411, 406, 522, 452.1, 403, 455/419, 405, 407

See application file for complete search history.

(56) References Cited

U.S. PATENT DOCUMENTS

| | | | |
|---|---|---|---|
| 6,865,170 B1 * | 3/2005 | Zendle .......................... | 370/338 |
| 8,150,992 B2 * | 4/2012 | Chapweske et al. ........... | 709/231 |
| 8,774,167 B2 * | 7/2014 | Tapia et al. .................... | 370/352 |
| 2002/0034296 A1 * | 3/2002 | Yoshimune et al. ........... | 380/239 |
| 2012/0224528 A1 * | 9/2012 | Tapia et al. .................... | 370/328 |
| 2013/0083472 A1 * | 4/2013 | McMaster et al. ........ | 361/679.31 |
| 2013/0316672 A1 * | 11/2013 | Nousiainen et al. ........... | 455/406 |

* cited by examiner

*Primary Examiner* — Joseph Arevalo

(57) ABSTRACT

A device may obtain resource utilization data associated with a machine-to-machine device. The resource utilization data may include information identifying a quantity of data transmitted by the machine-to-machine device during a particular period of time, and an amount of network resources utilized by the machine-to-machine device during the particular period of time. The device may determine a billing metric based on the quantity of data and the amount of network resources utilized by the machine-to-machine device. The device may determine, based on the billing metric, a cost associated with the amount of network resources utilized by the machine-to-machine device. The device may charge the fee associated with the utilization of the network resources by the machine-to-machine device to an account of a subscriber associated with the machine-to-machine device.

20 Claims, 10 Drawing Sheets

700 ⟶

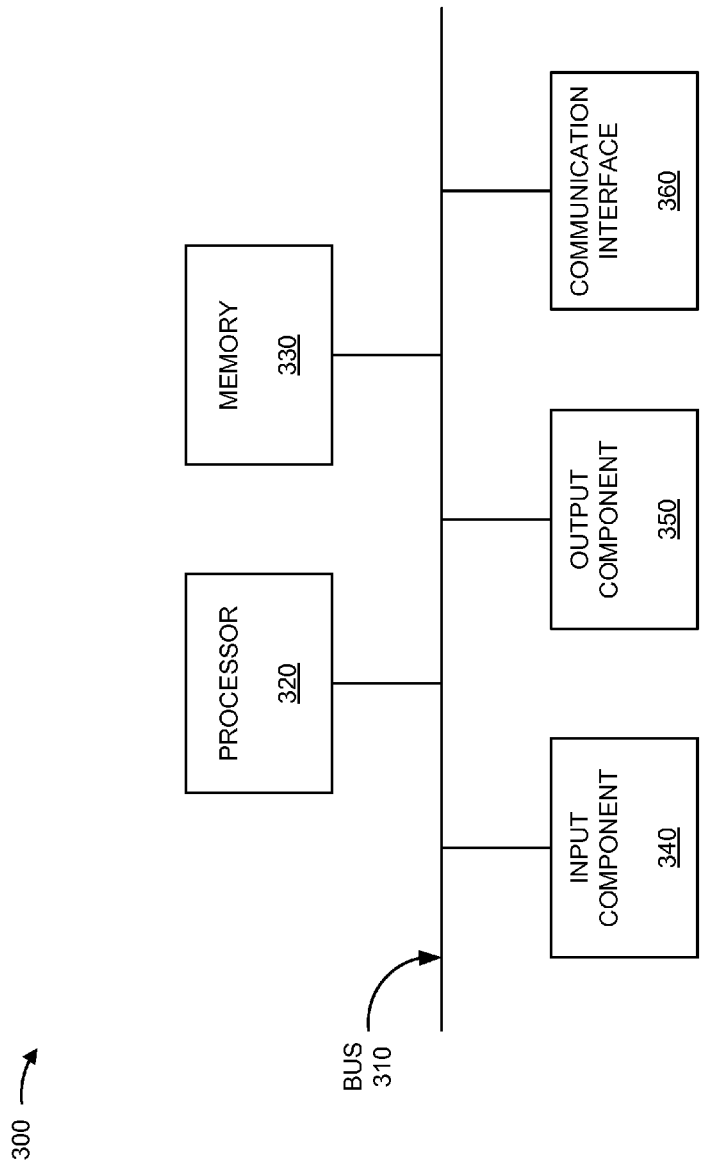

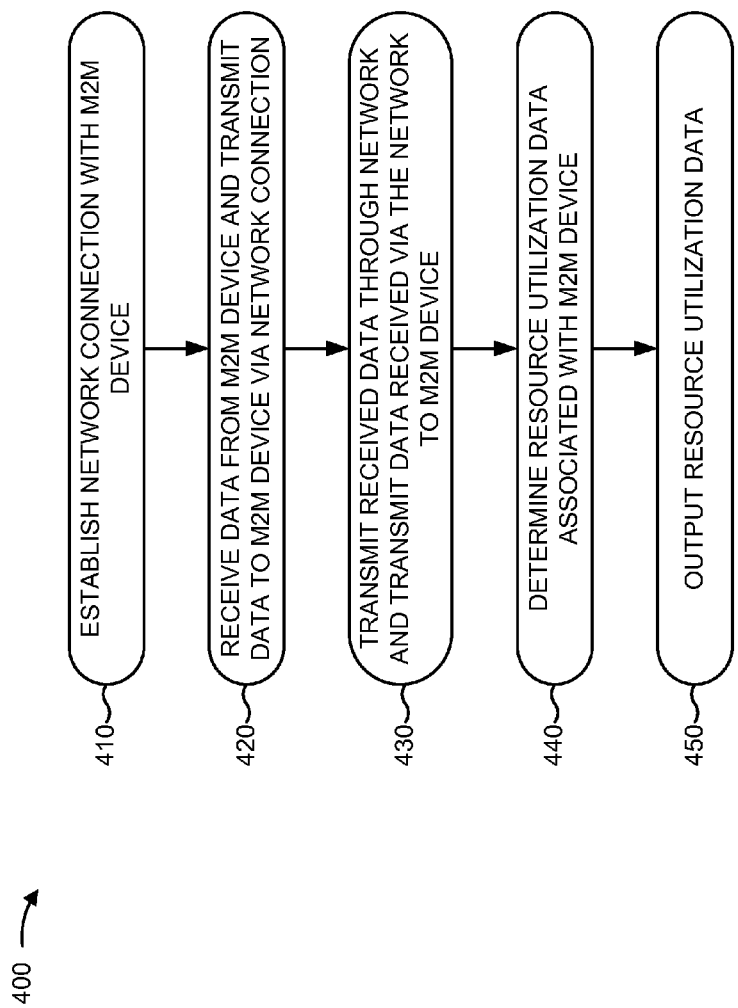

RESOURCE-BASED BILLING AND MONITORING FOR M2M

BACKGROUND

Network service providers may determine a fee for transmitting data through a network of the network service provider based on an amount of data transmitted.

BRIEF DESCRIPTION OF THE DRAWINGS

FIG. 3 is a diagram illustrating example components of a device that may be used within the environment of FIG. 2;

FIG. 4 is a flow chart of an example process for determining resource utilization data;

DETAILED DESCRIPTION

The following detailed description refers to the accompanying drawings. The same reference numbers in different drawings may identify the same or similar elements.

Machine-to-Machine (M2M) communications may refer to technologies that allow devices to communicate with one another over wired or wireless networks. M2M communications can be found in a number of economic sectors, such as security, product tracking, health care, and remote monitoring and diagnostics. An M2M device may include a sensor, a meter, or another device that captures data relating to an "event" (e.g., meter reading, temperature, inventory level, etc.). Commonly, the M2M device establishes a constant or "always on" connection with a network and the captured data is transmitted through the network, via the connection, to an application server that translates the data into meaningful information (e.g., a notification regarding the occurrence of the event, an indication that an item needs to be restocked, etc.). Thus, M2M communications may be characterized by periodic, semi-periodic, or on-demand transmission of small amounts of data. While an amount of data transmitted from the M2M device may be small, the constant connection maintained by the M2M device may incur a high utilization of network resources.

A network service provider may determine a fee for transmitting data through a network of the network service provider based on an amount of data transmitted. However, determining the fee based on the amount of data transmitted by, for example, an M2M device, may not account for a cost associated with network resources utilized to transmit the data through the network.

Systems and/or methods described herein may allow a network service provider to track a device's utilization of network resources to determine resource utilization data associated with the device's transmitting of data through a network of the network service provider. The resource utilization may be provided to a billing system of the network service provider. The billing system may determine a fee for the device based on the resource utilization data. The fee may account for an amount of data transmitted by the device and/or the device's utilization of network resources.

Figure 1:
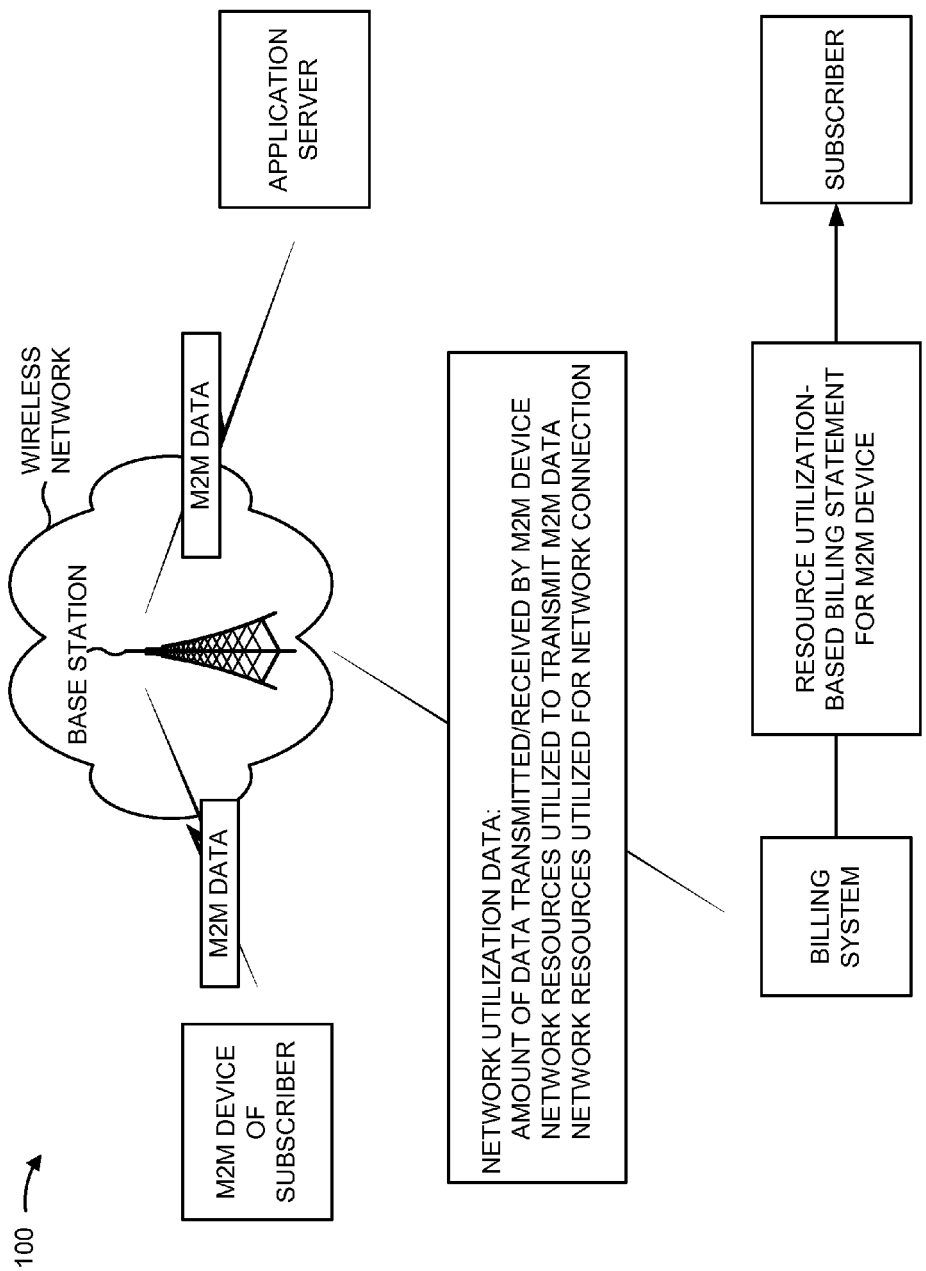
FIG. 1 is a diagram illustrating an overview of an example implementation described herein.

FIG. 1 is a diagram illustrating an overview 100 of an example implementation described herein. For overview 100, assume that a subscriber deploys an M2M device in an area associated with a wireless network of a network service provider and that the M2M device establishes a constant connection with the wireless network via a base station of the network service provider. Referring now to FIG. 1, the M2M device may determine an occurrence of an event and may transmit data ("M2M data") regarding the event to the base station. The base station may receive the M2M data and may transmit the M2M data to an application server that processes the M2M data. The base station may determine an amount of M2M data transmitted between the base station and the M2M device (e.g., a size of the M2M data) and resource utilization data associated with the M2M device. The resource utilization data may include information identifying network resources utilized to transmit the M2M data between the base station and the M2M device and/or network resources utilized to establish and/or maintain the constant connection between the M2M device and the wireless network. The base station may send the resource utilization data to a billing system of the network service provider.

The billing system may receive the resource utilization data and may determine a data delivery rate (e.g., an amount charged per unit of data (e.g., kilobyte, megabyte, etc.) transmitted) for transmitting the M2M data based on a resource utilization-based billing method. The resource utilization-based billing method may account for the amount of data transmitted by the M2M device and an amount of network resources utilized by the M2M device to establish the constant connection, maintain the constant connection, and/or transmit the M2M data. The billing system may generate a resource utilization-based billing statement that identifies the data delivery rate and/or data delivery charges determined, for the M2M device, based on the data delivery rate. The resource utilization-based billing method may allow the network service provider to generate an amount of revenue sufficient to cover costs associated with transmitting the data as well as costs associated with the M2M device's utilization of network resources. Further, the resource utilization-based billing method may provide an incentive to the subscriber to develop more efficient methods and/or applications associated with the M2M device transmitting data and/or utilizing network resources.

Figure 2:
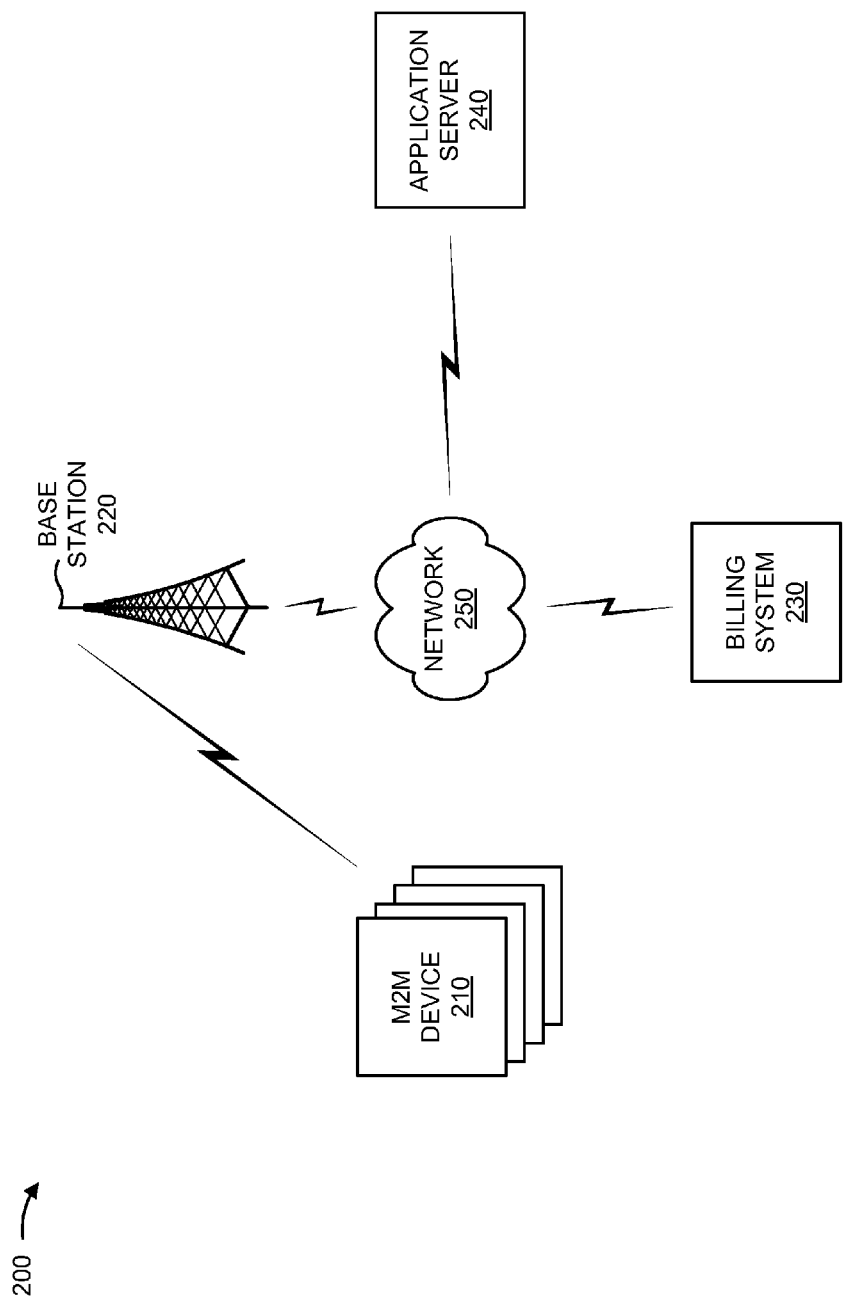
FIG. 2 is a diagram illustrating an environment in which systems and/or methods, described herein, may be implemented.

FIG. 2 is a diagram illustrating an environment 200 in which systems and/or methods, described herein, may be implemented. As shown in FIG. 2, environment 200 may include a set of M2M devices 210, a base station 220, a billing system 230, and/or an application server 240 interconnected by network 250.

M2M device 210 may include an M2M device capable of establishing a connection with base station 210 and transmitting data via the established connection. M2M device 210 may include a sensor, a meter, and/or another type of device for capturing data (e.g., a meter reading, a temperature measurement, a resource usage measurement, an inventory level, motion detection, object detection, etc.) and transmitting the captured data, via base station 220, to application server 240.

Base station 220 may include a network device that establishes a connection with M2M device 210 and receives, processes, and/or transmits data received from M2M device 210 via the established connection. Base station 220 may transmit the data towards application server 240. Base station 220 may determine resource utilization data associated with M2M device 210. The resource utilization data may identify an amount of data transmitted by M2M device 210, network resources utilized to transmit the data, and/or network resources utilized to establish and/or maintain the connection. Base station 220 may transmit the resource utilization data to billing system 230.

Billing system 230 may include a device, such as a server, capable of receiving, storing, generating, aggregating, and/or providing usage and billing information. For example, billing system 230 may receive resource utilization data, associated with M2M device 210, from base station 220. The resource utilization data may include information identifying an amount of data transmitted by M2M device 210 and/or information identifying network resources utilized by M2M device 210. Billing system 230 may determine a data delivery rate based on the resource utilization data. Billing system 230 may generate a subscriber bill that identifies the data delivery rate and/or network resources utilized by M2M device 210 and may provide the subscriber bill to a subscriber associated with M2M device 210 and/or application server 240.

Application server 240 may include a server device capable of receiving data captured by M2M device 210, processing the data, and/or performing a task (e.g. a data analysis, such as, for example, a temperature trend analysis, an inventory analysis, a sales trend analysis, etc.) based on the data. In some implementations, application server 240 may receive resource utilization data associated with M2M device 210. Application server 240 may analyze the resource utilization data and may generate a control instruction for modifying a behavior of M2M device 210. The modified behavior may enable M2M device 210 to more efficiently utilize network resources. Application server 240 may transmit the control instruction to M2M device 210.

Network 250 may include one or more wired and/or wireless networks. For example, network 250 may include a cellular network, such as, for example, a Long Term Evolution (LTE) network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

Although FIG. 2 shows example components of environment 200, in some implementations, environment 200 may include fewer components, different components, differently arranged components, or additional components than those depicted in FIG. 2.

FIG. 3 is a diagram illustrating example components of a device 300. Device 300 may correspond to M2M device 210, base station 220, billing system 230, and/or application server 240. Additionally, or alternatively, each of M2M device 210, base station 220, billing system 230, and/or application server 240 may include one or more devices 300 and/or one or more components of device 300. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a camera, a microphone, a switch, etc.). Output component 350 may include a component that outputs information from device 300 (e.g., a display, an audio speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, a communication interface 360 may include an Ethernet interface, an optical interface, a coaxial interface, an infrared interface, a radio frequency (RF) interface, a universal serial bus (USB) interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

FIG. 4 is a flow chart of an example process 400 for determining resource utilization data. In some implementations, process 400 may be performed by base station 210. In other implementations, one or more blocks of process 400 may be performed by one or more devices instead of, or possibly in conjunction with, base station 210.

Process 400 may include establishing a network connection with an M2M device (block 410). For example, M2M device 210 may send a request to establish a network connection to base station 220. Base station 220 may receive the request and may determine whether network resources are available for establishing the connection.

In some implementations, base station 220 may be partitioned into a number of sectors. Each sector may be able to support a limited number of simultaneous connections. For example, base station 220 may comprise a 3-sector base station that includes 3 sectors. Base station 220 may determine a number of simultaneous connections currently being maintained by one or more of the sectors. Base station 220 may determine whether the network resources are available for establishing the connection based on the number of simultaneous connections currently being maintained. In some implementations, base station 220 may determine a number of simultaneous connections being maintained with other M2M devices 210. For example, to ensure that base station 220 has available resources for establishing connections with non-M2M devices (e.g., user devices, such as cell phones, smart phones, etc.), base station 220 may limit the number of simultaneous connections maintained with M2M devices 210 by one or more of the sectors. Base station 220 may determine that the number of simultaneous connections currently being maintained with M2M devices 210 is less than a threshold number of connections and may determine that network resources are available for establishing the connection with M2M device 210.

In some implementations, to establish the network connection various signaling may be performed between base station 220 and M2M device 210. For example, signaling may be performed to establish control channels, to establish traffic channels, and/or to perform authentication/authorization of M2M device 210 and/or a particular service requested by M2M device 210. The connection may be established based on establishing the control channels, establishing the traffic channels, and/or performing the authentication/authorization of M2M device 210 and/or the particular service. The established connection may allow M2M device 210 to transmit data through a network (e.g., network 250) and to application server 240 via base station 220.

Process 400 may include receiving data from the M2M device and transmitting data to M2M device via the network connection (block 420) and transmitting the received data through the network and transmitting data received via the network to M2M device (block 430). For example, M2M device 210 may include a sensor that captures data related to an occurrence of an event. M2M device 210 may transmit the captured data to base station 220. Base station 220 may receive the data from M2M device 210 and may transmit the data to application server 240. Application server 240 may receive the data. In some implementations, application server 240 may process the data and/or perform a task based on the data. For example, the data may include temperature measurements of a component monitored by a sensor included in M2M device 210. Application server 240 may receive the temperature measurements and may analyze the temperature measurements to determine temperature trend information associated with the component.

Process 400 may include determining resource utilization data associated with the M2M device (block 440). For example, base station 220 may determine resource utilization data associated with M2M device 210. The resource utilization data may include a size of the data, an amount of bandwidth utilized to receive and/or transmit data between M2M device 210 and base station 220, network resources utilized to receive and/or transmit data between M2M device 210 and base station 220, network resources utilized to receive data from application server 240 and/or transmit data to application server 240, network resources utilized to establish the network connection (e.g., a number of access attempts made, network resources used to perform signaling, etc.), and/or network resources utilized to maintain the network connection (e.g., an amount of time that the network connection has been established, a total amount of time that M2M device 210 has maintained a connection to the network (e.g., via the network connection and/or one or more other network connections established during a particular period of time, such as, for example, since other data was previously received from M2M device 210)).

Additionally, or alternatively, base station 220 may receive one or more portions of the resource utilization data from one or more other devices. For example, to establish the network connection, M2M device 210 and/or base station 220 may perform signaling with one or more other devices included in the network, such as, for example, a serving gateway device, a packet data network gateway device, a home subscriber server, or an authentication, authorization, and accounting server. Base station 220 may receive information identifying network resources utilized to perform the signaling from the one or more other devices.

In some implementations, base station 220 may determine the resource utilization data based on receiving the data from M2M device 210. For example, base station 220 may determine resource utilization data for M2M device 210 each time that base station 220 receives data from M2M device 210 and/or when transmitting the data to application server 240.

In some implementations, base station 220 may determine the resource utilization data periodically and/or in response to a command received from billing system 230. For example, base station 220 may determine resource utilization data for each device (e.g., M2M device 210) from which base station 220 receives data. Base station 220 may store the resource utilization data in a memory. Billing system 230 may periodically (e.g., daily, weekly, monthly, etc.) send a command to base station 220. The command may include information identifying one or more devices (e.g., M2M device 210) for which base station 220 is to determine resource utilization data. Base station 220 may access the memory and obtain resource utilization data stored for the one or more devices identified in the command.

Process 400 may include outputting the resource utilization data (block 450). For example, base station 220 may transmit the resource utilization data determined for M2M device 210 to billing system 230. Billing system 230 may receive the resource utilization data and may store the resource utilization data in a memory. In some implementations, the resource utilization data may include information identifying M2M device 210. For example, a header of a packet included in a transmission of the resource utilization data may include an identifier and/or other information identifying M2M device 210 and/or application server 240. Billing system 230 may determine that the resource utilization information is associated with M2M device 210 and/or application server 240 based on the identifier and/or other information identifying M2M device 210 and/or application server 240. Billing system 230 may store the resource utilization information in a profile associated with M2M device 210 and/or application server 240. In some implementations, the profile may store resource utilization information determined for M2M device 210 during a particular period (e.g., a billing period, a month, a week, etc.). At the end of the particular period, billing system 230 may utilize the resource utilization data stored in the profile to perform a resource usage-based billing method for determining a data delivery rate associated with M2M device 210 transmitting data during the particular period.

In some implementations, base station 220 may transmit the resource utilization data to application server 240. Application server 240 may analyze the resource utilization data to determine how efficiently M2M device 210 is utilizing network resources. Based on the efficiency of M2M device 210, application server 240 may determine one or more modifications regarding the utilization of network resources by M2M device 210. Application server 240 may generate a control instruction for implementing the one or more modifications and may transmit the control instruction to M2M device 210.

In some implementations, the one or more modifications may include a modification related to an amount of time that M2M device 210 maintains a connection with base station 220 and/or a maximum number of access attempts made by M2M device 210 to establish a connection with base station 220. For example, the modification may cause M2M device 210 to periodically terminate the connection for a particular amount of time to reduce an amount of time that the connection is maintained. In some implementations, the particular amount of time may be determined based on the resource utilization data. For example, application server 240 may analyze the resource utilization data and may determine amounts of data transmitted by M2M device 210 during different portions of the day. Application server 240 may determine that an amount of data transmitted by M2M device 210 during a particular portion of the day (e.g., from 1:00 am until 2:00 am, morning, evening, etc.) is less than a threshold amount of data and/or that an amount of time for establishing a connection during the particular portion of the day is less than a threshold amount of time. Application server 240 may determine a modification that causes M2M device 210 to periodically terminate a connection between M2M device 210 and base station 220 during the particular portion of the day.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel. Further, one or more blocks may be omitted in some implementations.

Figure 5A:
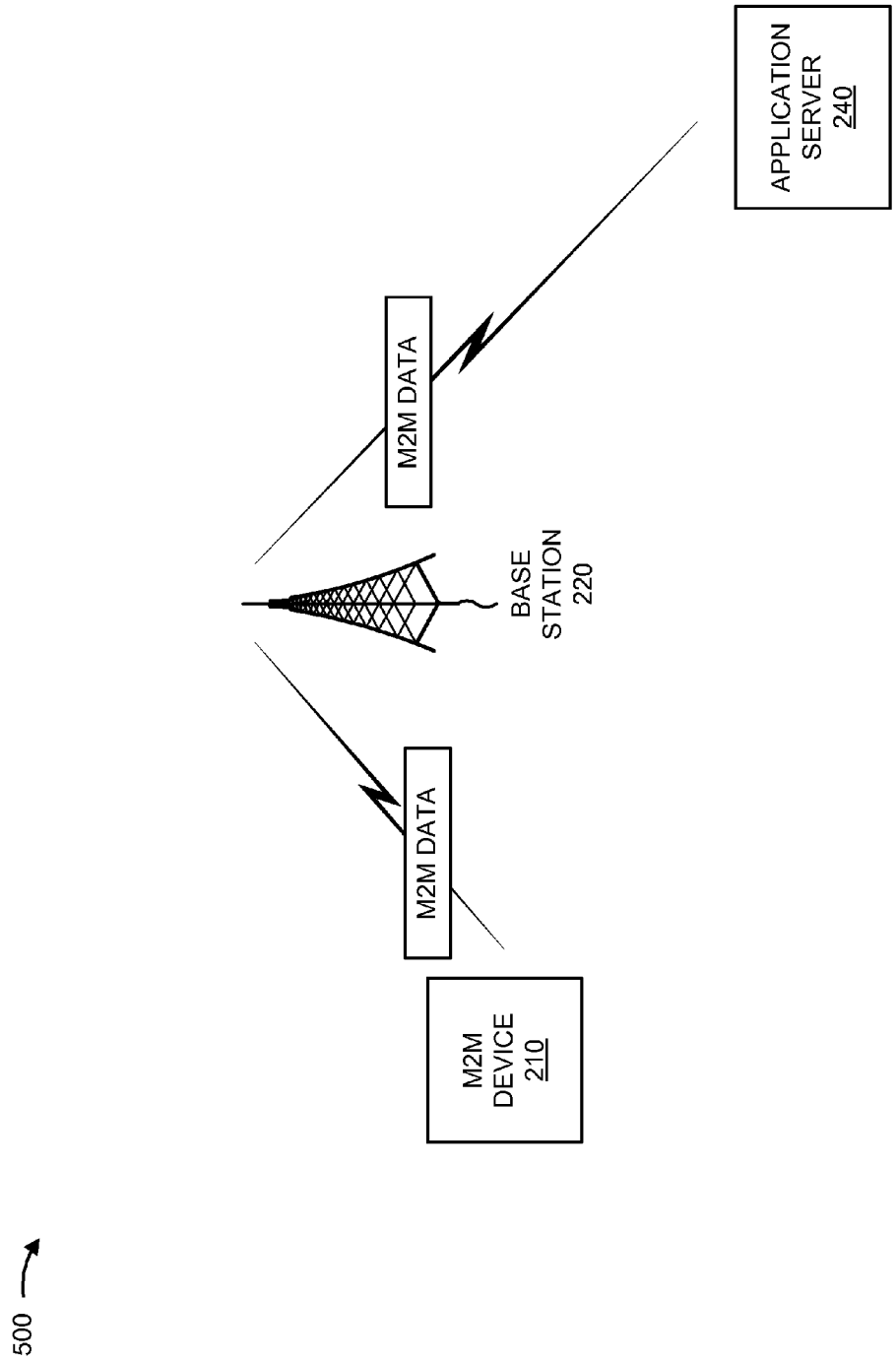
FIGS. 5A and 5B are diagrams illustrating an example of the process described in connection with FIG. 4.
Figure 5B:
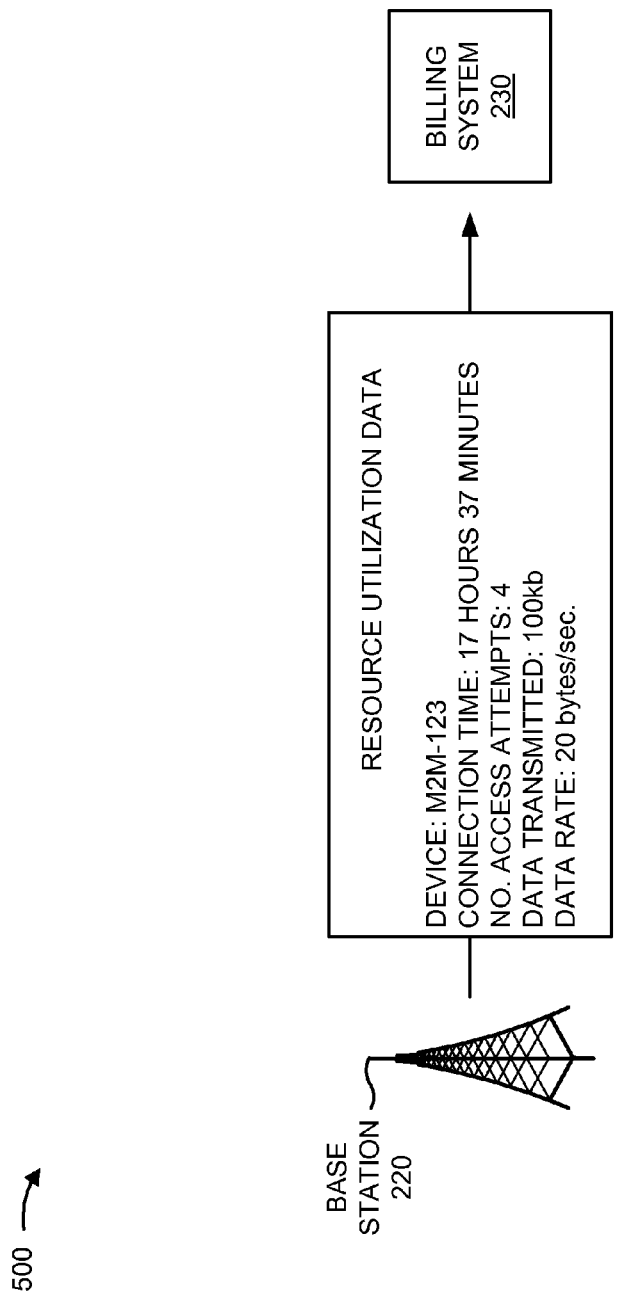

FIGS. 5A and 5B are diagrams of an example 500 of process 400 described in connection with FIG. 4. For example 500, assume that M2M device 210 makes 4 access attempts and subsequently establishes a connection with base station 220 for transmitting data to application server 240. Further, assume that M2M device 210 captures data ("M2M data") related to an occurrence of an event associated with M2M device 210. Referring to FIG. 5A, M2M device 210 may send the M2M data to application server 240 via base station 220. Application server 240 may receive the M2M data and may process the M2M data to determine information related to the occurrence of the event.

For FIG. 5B, assume that base station 220 receives information, from M2M device 210, regarding the number of access attempts made by M2M device 210 when establishing the connection. Referring to FIG. 5B, base station 220 may determine resource utilization data associated with M2M device 210 transmitting the M2M data. Base station 220 may transmit the resource utilization data to billing system 230. As shown in FIG. 5B, the resource utilization data includes information identifying M2M device 210, information identifying an amount of time that the network connection has been established, information identifying the number of access attempts, information identifying an amount of data transmitted by M2M device 210 to base station 220, and information identifying a data rate at which the amount of data was transmitted. Billing system 230 may receive the resource utilization data from base station 220. Billing system 230 may use the resource utilization data to perform a resource utilization-based billing process for determining a data delivery rate used to calculate a cost associated with transmitting the M2M data. Billing system 230 may charge the calculated cost to an account associated with the subscriber and may send a resource utilization-based billing statement that reflects the calculated cost to the subscriber.

As indicated above, FIGS. 5A and 5B are provided merely as an example. Other examples are possible and may differ from what was described with regard to FIGS. 5A and 5B.

Figure 6:
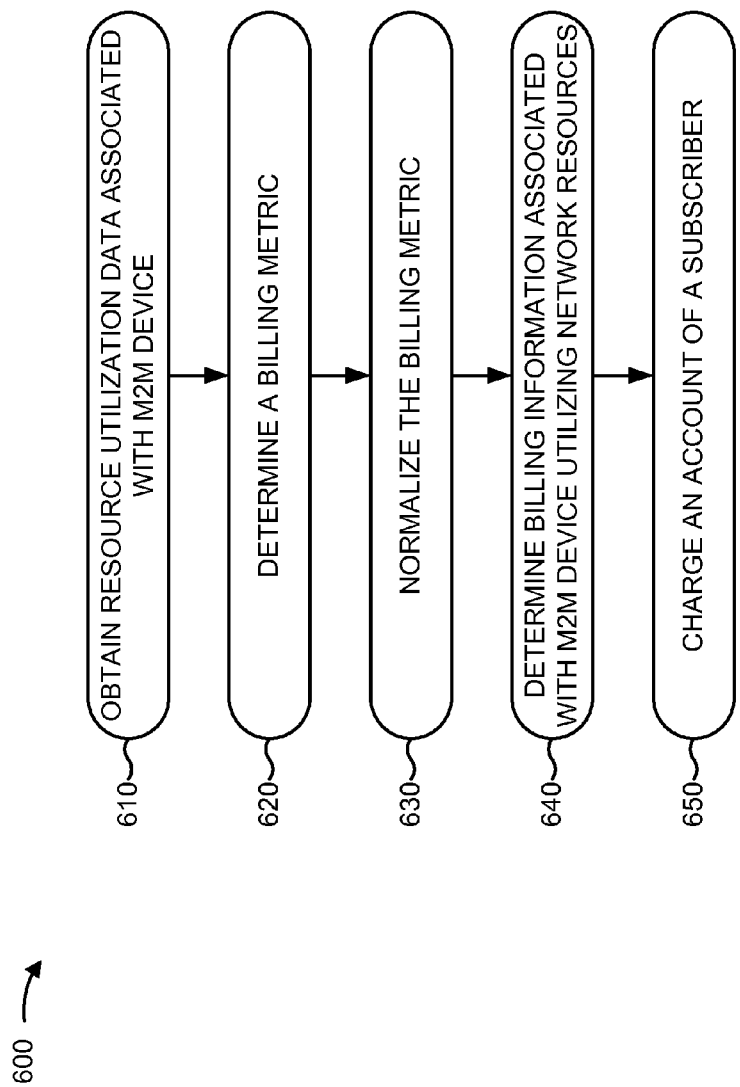
FIG. 6 is a flow chart of an example process for performing resource utilization-based billing.

FIG. 6 is a flow chart of an example process 600 for performing resource-based billing. In some implementations, process 600 may be performed by billing system 230. In other implementations, one or more blocks of process 600 may be performed by one or more devices instead of, or possibly in conjunction with, billing system 230.

Process 600 may include obtaining resource utilization data associated with an M2M device (block 610). For example, base station 220 may determine resource utilization data for M2M device 210 and may transmit the resource utilization data to billing system 230. Billing system 230 may receive the resource utilization data associated with M2M device 210 from base station 220.

In some implementations, billing system 230 may periodically receive the resource utilization data. For example, during a particular period of time (e.g., a billing cycle, such as, for example, 1 month), billing system 230 may periodically receive resource utilization data from base station 220. Billing system 230 may store the received resource utilization data in a data structure. At the end of the particular period of time, billing system 230 may access the data structure and obtain resource utilization data associated with M2M device 210. Additionally, or alternatively, billing system 230 may receive one or more portions of the resource utilization data from another device.

The resource utilization data may include information identifying an amount of data transmitted by M2M device 210, network resources utilized to receive data from M2M device 210, network resources utilized to transmit data to application server 240, network resources utilized to establish a network connection between base station 220 and M2M device 210, a number of access attempts made by M2M device 210, network resources used to perform signaling for establishing a network connection, network resources utilized to maintain the network connection, and/or information identifying a total amount of time that M2M device 210 maintained a connection to the network.

Process 600 may include determining a billing metric (block 620). For example, billing system 230 may filter the network usage data to determine one or more usage parameters (e.g., an amount of data transmitted by M2M device 210, an amount of time that M2M device 210 maintained a network connection with base station 220, and/or a number of access attempts made by M2M device 210). Billing system 230 may use an averaging mechanism to determine a billing metric based on the one or more usage parameters. The billing metric may indicate how efficiently M2M device 210 utilized network resources during a particular period of time (e.g., a billing cycle, such as, for example, 1 month).

In some implementations, the resource utilization data may include information identifying one or more amounts of data transmitted by M2M device 210 during the particular period of time and one or more amounts of time that M2M device 210 maintained a network connection with base station 220. Billing system 230 may filter the resource utilization data to obtain the one or more amounts of data and the one or more periods of time and may determine a total amount of data transmitted by M2M device 210 during the particular period of time and a total amount of time that M2M device 210 maintained a network connection with base station 220 during the particular period of time. Billing system 230 may determine the billing metric by dividing the total amount of time by the total amount of data. A larger billing metric may indicate a more inefficient use of network resources.

In some implementations, the resource utilization data may include information identifying a number of access attempts made by M2M device 210. Billing system 230 may determine the billing metric based on the number of access attempts. For example, billing system 230 may divide the total amount of time that M2M device 210 maintained the network connection by the total amount of data transmitted by M2M device 210 to obtain an initial billing metric value. Billing system 230 may modify the initial billing metric value based on the number of access attempts. In some implementations, the initial billing metric may be modified by a function of the number of access attempts. For example, the billing metric may be modified by adding the number of access attempts to the initial billing metric value. In some implementations, the initial billing metric may be modified by multiplying the initial billing metric value by a function of the number of access attempts (e.g., the number of access attempts divided by an average number of access attempts made by devices establishing connections with base station 220 during the particular period of time). Additionally, or alternatively, the billing metric may be determined based on other data indicating a utilization of network resources by M2M device 210 during the particular period of time.

In some implementations, billing system 230 may determine multiple billing metrics and/or normalize one or more of the determined billing metrics. For example, billing system 230 may determine a total amount of data transmitted by M2M device 210 during the particular period of time and a total amount of time that M2M device 210 maintained a network connection with base station 220 during the particular period of time. Billing system 230 may determine a first billing metric by dividing the total amount of time by the total amount of data. Billing system 230 may determine the total number of access attempts made by M2M device 210 during the particular period of time and may determine a second billing metric based on the number of access attempts. In some implementations, billing system 230 may determine a final billing metric based on the first billing metric and the second billing metric. For example, billing system 230 may determine a weighted average of the first billing metric and the second billing metric.

In some implementations, M2M device 210 may be associated with a particular subscriber. Billing system 230 may determine a total number of M2M devices 210 associated with the particular subscriber. Billing system 230 may determine the billing metric based on the total number of M2M devices 210 associated with the particular subscriber. For example, billing system 230 may determine a data delivery rate for data transmitted by M2M device 210 based only on the quantity of data transmitted when M2M device 210 is associated with a subscriber that is associated with a total number of M2M devices 210 that is less than a threshold number of M2M devices. Billing system 230 may determine the data delivery rate based on the quantity of data transmitted and a utilization of network resources by M2M device 210 when the subscriber is associated with a total number of M2M devices 210 that is greater than the threshold number of M2M devices (e.g., an enterprise subscriber that deploys a large number of M2M devices). In this way, billing system 230 may provide an incentive to develop applications for increasing an efficiency of a utilization of network resources by M2M device 210 to particular subscribers that may be in the best position to develop the applications and/or influenced the most by a resource usage-based billing method.

Process 600 may include normalizing the billing metric (block 630). For example, billing system 230 may normalize the billing metric by mapping the billing metric to a data delivery rate. The mapping may be a linear mapping (e.g., the billable resource value increases in proportion to increases in the billing metric), a threshold-based mapping (e.g., a billable resource value is constant for a range of billing metrics up to a threshold billing metric), a combination of a linear mapping and a threshold-based mapping (e.g., a billable resource value is constant for a range of billing metrics up to a threshold billing metric and increases in a one-to-one correspondence with the billing metric for billing metrics greater than the threshold billing metric), and/or another type of mapping. Additionally, or alternatively, the billing metric may be normalized using another method. In some implementations, billing system 230 may determine multiple billing metrics and may normalize one or more of the determined billing metrics.

Process 600 may include determining billing information associated with the M2M device utilizing the network resources (block 640). For example, billing system 230 may use the normalized billing metric to determine billing information associated with M2M device 210 transmitting data and/or utilizing network resources during a particular period of time.

In some implementations, the billing information may include information identifying a fee that accounts for a cost associated with an amount of data transmitted by M2M device 210 during the particular period of time and/or a fee that accounts for a cost associated with an amount of network resources utilized during the particular period of time. For example, billing system 230 may multiply an amount of data transmitted by M2M device 210 during the particular period by an amount charged per unit data (e.g., a data delivery rate, such as, for example, an amount charged per kilobyte of data transmitted by M2M device 210) to calculate a fee associated with M2M device 210 transmitting data via base station 220.

Additionally, or alternatively, billing system 230 may determine a fee associated with M2M device 210 utilizing network resources to transmit the amount of data, establish one or more network connections with base station 220, and/or maintain the one or more network connections with base station 220 during the particular period of time. The billing information may include information identifying the fee associated with M2M device 210 utilizing network resources to transmit the amount of data, establish one or more network connections with base station 220, and/or maintain the one or more network connections with base station 220 during the particular period of time. For example, billing system 230 may multiply the amount of data transmitted by M2M device 210 during the particular period of time by the normalized billing metric to determine the fee.

In some implementations, the billing information may include information identifying an efficiency level associated with M2M device 210. For example, billing system 230 may use the billing metric to determine an efficiency level at which M2M device 210 utilized network resources during the particular period of time. In some implementations, billing system 230 may determine an average billing metric based on resource usage data determined for one or more other devices transmitting data via base station 220. For example, billing system 230 may obtain resource usage data for each device transmitting data via base station 220, for each M2M device 210 transmitting data via base station 220, and/or for each non-M2M device transmitting data via base station 220. Billing system 230 may determine an average billing metric based on the obtained resource usage data. Billing system 230 may compare the billing metric determined for M2M device 210 with the average billing metric to determine the efficiency level at which M2M device 210 utilized the network resources during the particular period of time.

In some implementations, billing system 230 may provide information identifying the efficiency level to M2M device 210, application server 240, and/or a subscriber associated with M2M device 210 and/or application server 240. For example, the subscriber may subscribe to a service for monitoring the efficiency level of M2M device 210. Billing system 230 may determine the efficiency level for M2M device 210 and may provide information identifying the efficiency level to the subscriber. The subscriber may use the information identifying the efficiency level to modify an operation of M2M device 210 (e.g., limit an amount of time that M2M device 210 maintains a connection with base station 220, limit a number of access attempts made by M2M device 210 to establish a connection with base station 220, etc.).

Process 600 may include charging an account of a subscriber (block 650). For example, billing system 230 may charge a fee that accounts for a cost associated with an amount of data transmitted by M2M device 210 during a particular period of time and a fee that accounts for a cost associated with an amount of network resources utilized during the particular period of time to an account of a subscriber associated with M2M device 210 and/or application server 240. In some implementations, billing system 230 may generate a subscriber billing statement based on fees charged to the account of the subscriber during a particular period of time. For example, billing system 230 may receive resource utilization data from base station 220 each time M2M device 210 transmits data via base station 220. In response to receiving each resource utilization data, billing system 230 may determine a fee that accounts for a cost associated with an amount of data transmitted by M2M device 210 and/or a fee that accounts for a cost associated with an amount of network resources utilized by M2M device 210. Billing system 230 may charge the determined fees to the account of the subscriber. At the end of a particular period of time (e.g., at the end of a billing cycle), billing system 230 may aggregate the fees charged to the account of the subscriber and may send a subscriber billing statement to the subscriber. The subscriber billing statement may include information identifying a total of the aggregation of the fees charged to the account, information identifying one or more of the individual fees charged to the account, one or more portions of the resource utilization data, information identifying the billing metric and/or the normalized billing metric, information identifying an efficiency level associated with a utilization of network resources by M2M device 210, etc.

Although FIG. 6 shows example blocks of process 600, in some implementations, process 600 may include additional blocks, different blocks, fewer blocks, or differently arranged blocks than those depicted in FIG. 6. Additionally, or alternatively, one or more of the blocks of process 600 may be performed in parallel. Further, one or more blocks may be omitted in some implementations.

Figure 7A:
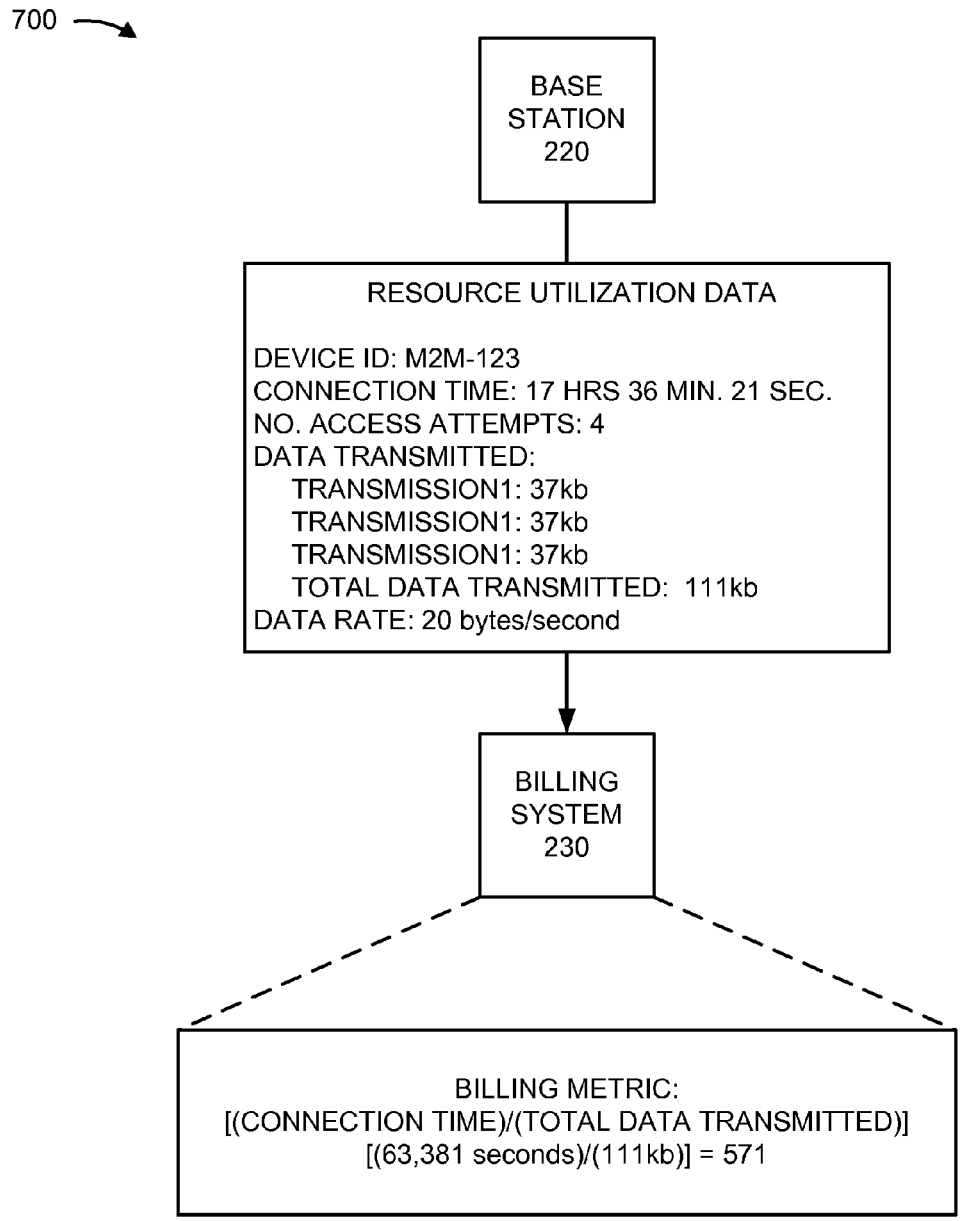
FIGS. 7A-7C are diagrams illustrating an example of the process described in connection with FIG. 6.
Figure 7B:
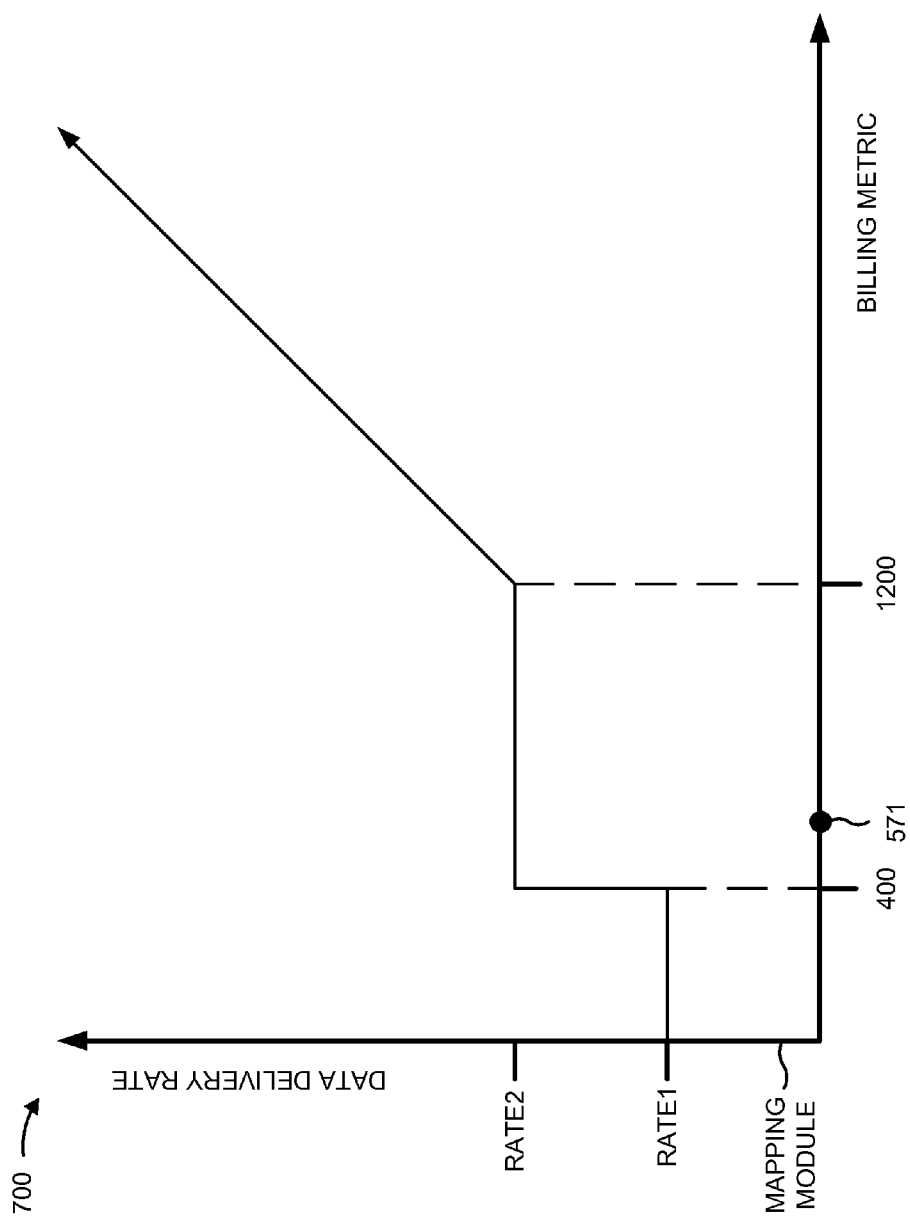
Figure 7C:
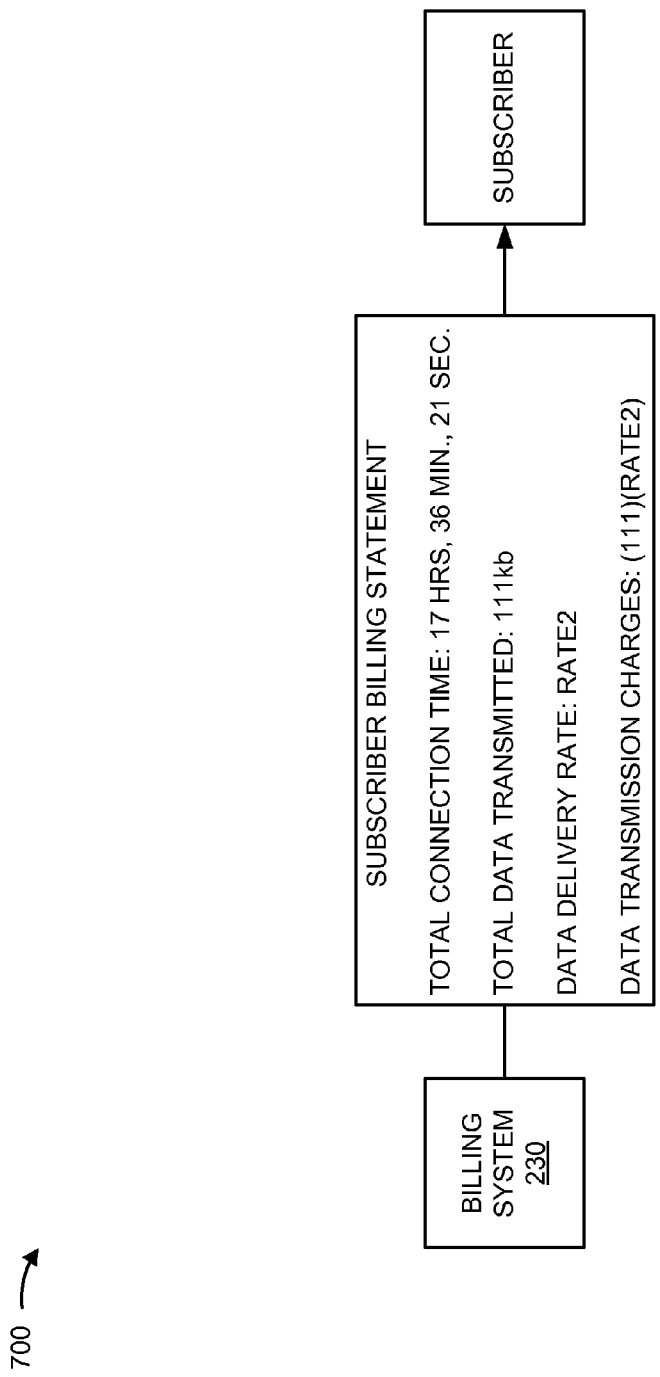

FIGS. 7A-7C are diagrams of an example 700 of process 600 described in connection with FIG. 6. For example 700, assume that a particular M2M device 210 ("M2M-123") establishes a connection with base station 220 and transmits data via the connection. Further, assume that base station 220 determines resource utilization data for the M2M-123. Referring to FIG. 7A, base station 220 may send the resource utilization data to billing system 230. Billing system 230 may receive the resource utilization data and may determine a billing metric for the M2M-123. As shown in FIG. 7A, the resource utilization data includes information identifying the M2M-123, an amount of time that the connection between the M2M-123 and base station 220 was maintained, amounts of data transmitted by the M2M-123 via the connection, and a data rate at which the amounts of data were transmitted. Billing system 230 may filter the resource utilization data to determine one or more resource parameters. Billing system 230 may determine the billing metric based on the one or more resource parameters. As further shown in FIG. 7A, billing system 230 calculates the billing metric based on the connection time and the total amount of data transmitted by the M2M-123.

Referring to FIG. 7B, billing system 230 may use a mapping module to normalize the billing metric by mapping the billing metric to a data delivery rate. As shown in FIG. 7B, the mapping module includes two threshold-based mappings and a linear mapping. Based on the mapping module, billing system 230 maps the billing metric to a particular data delivery rate ("RATE2").

For FIG. 7C, assume that billing system 230 uses the RATE2 to calculate a fee associated with the M2M-123 transmitting the data and generates a subscriber billing statement for a subscriber associated with the M2M-123. Referring to FIG. 7C, billing system may transmit the subscriber billing statement to the subscriber. The subscriber billing statement may include information identifying a portion of the resource utilization data received from base station 220, the data delivery rate determined based on the resource utilization data, and information identifying a fee for the M2M-123 transmitting the data. Basing the fee on the M2M-123's utilization of network resources may provide the subscriber with an incentive to enable the M2M-123 to utilize network resources more efficiently.

As indicated above, FIGS. 7A-7C are provided merely as an example. Other examples are possible and may differ from what was described with regard to FIGS. 7A-7C.

The foregoing description provides illustration and description, but is not intended to be exhaustive or to limit the implementations to the precise form disclosed. Modifications and variations are possible in light of the above disclosure or may be acquired from practice of the implementations. For example, while the above description focused on M2M devices, implementations, described herein, are equally applicable to performing resourced-based billing for other types of devices.

As used herein, the term component is intended to be broadly interpreted to refer to hardware or a combination of hardware and software, such as software executed by a processor. Further, terms such as, for example, "small," "large," "low," "high," etc. are relative terms that may be measured relative to a threshold.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. Also, as used herein, the article "a" is intended to include one or more items and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method comprising:
obtaining, by a device, resource utilization data associated with a machine-to-machine device,
the resource utilization data including information identifying:
a quantity of data transmitted by the machine-to-machine device during a particular period of time, and
an amount of network resources utilized by the machine-to-machine device during the particular period of time;
determining, by the device, a billing metric based on:
the quantity of data,
the amount of network resources utilized by the machine-to-machine device, and
an amount of time that a connection between the machine-to-machine device and a base station was maintained during the particular period of time;
determining, by the device and based on the billing metric, a cost associated with the amount of network resources utilized by the machine-to-machine device; and
providing, by the device, information identifying the cost associated with the amount of network resources utilized by the machine-to-machine device to a subscriber associated with the machine-to-machine device.

2. The method of claim 1, where the resource utilization data includes information identifying a quantity of access attempts made by the machine-to-machine device during the particular period of time, and
where determining the billing metric includes:
determining the billing metric further based on the quantity of access attempts.

3. The method of claim 1, where determining the cost associated with the amount of network resources utilized by the machine-to-machine device includes:
normalizing the billing metric; and
determining the cost associated with the amount of network resources utilized by the machine-to-machine device based on the normalized billing metric.

4. The method of claim 1, where determining the billing metric includes:
filtering the resource utilization data to determine the quantity of data and the amount of network resources utilized by the machine-to-machine device.

5. The method of claim 1, where determining the billing metric further comprises:
dividing the amount of time by the quantity of data to determine the billing metric.

6. The method of claim 1, further comprising:
determining that the subscriber is associated with a service for monitoring a utilization of network resources;
determining, based on the billing metric, an efficiency level at which the machine-to-machine device utilized network resources during the particular period of time; and
providing, based on the subscriber being associated with the service, information identifying the efficiency level to the subscriber.

7. The method of claim 1, where determining the billing metric includes:
applying an averaging function to the resource utilization data to determine the billing metric.

8. A device comprising:
a processor to:
obtain resource utilization data associated with a machine-to-machine device, the resource utilization data including information identifying:
a quantity of data transmitted by the machine-to-machine device during a particular period of time, and
network resources utilized by the machine-to-machine device during the particular period of time;
determine, based on applying an averaging function to the resource utilization data, a billing metric based on the quantity of data and the network resources utilized by the machine-to-machine device;
determine, based on the billing metric, a fee associated with a utilization of the network resources by the machine-to-machine device; and
charge the fee associated with the utilization of the network resources by the machine-to-machine device to an account of a subscriber associated with the machine-to-machine device.

9. The device of claim 8, where the resource utilization data includes information identifying a quantity of access attempts made by the machine-to-machine device during the particular period of time, and
where, when determining the billing metric, the processor is to:
determine the billing metric further based on the quantity of access attempts.

10. The device of claim 8, where, when determining the fee, the processor is to:
normalize the billing metric; and
determine the fee based on the normalized billing metric.

11. The device of claim 8, where, when determining the billing metric, the processor is to:
filter the resource utilization data to determine the quantity of data and the amount of network resources utilized by the machine-to-machine device.

12. The device of claim 8, where the resource utilization data includes information identifying an amount of time that a connection between the machine-to-machine device and a base station was maintained during the particular period of time, and
where, when determining the billing metric, the processor is to:
determine the billing metric further based on the amount of time that the connection between the machine-to-machine device and the base station was maintained during the particular period of time.

13. The device of claim 12, where, when determining the billing metric, the processor is further to:
divide the amount of time by the quantity of data to determine the billing metric.

14. The device of claim 8, where the processor is further to:
determine that the subscriber is associated with a service for monitoring a utilization of network resources;

determine, based on the billing metric, an efficiency level at which the machine-to-machine device utilized network resources during the particular period of time; and provide, based on the subscriber being associated with the service, information identifying the efficiency level to the subscriber.

15. A non-transitory computer-readable medium storing instructions, the instructions comprising:

one or more instructions that, when executed by a processor, cause the processor to:

obtain resource utilization data associated with a machine-to-machine device, the resource utilization data including information identifying:

a quantity of data transmitted by the machine-to-machine device during a particular period of time, and network resources utilized by the machine-to-machine device during the particular period of time;

determine, based on applying an averaging function to the resource utilization data, a billing metric based on the quantity of data and the network resources utilized by the machine-to-machine device;

determine, based on the billing metric, a fee associated with a utilization of the network resources by the machine-to-machine device;

charge an account of a subscriber associated with the machine-to-machine device the fee associated with the utilization of the network resources; and provide information identifying the fee associated with the utilization of the network resources to the subscriber.

16. The non-transitory computer-readable medium of claim 15, where the resource utilization data includes information identifying a quantity of access attempts made by the machine-to-machine device during the particular period of time, and where the one or more instructions to determine the billing metric, when executed by the processor, further cause the processor to:

determine the billing metric further based on the quantity of access attempts.

17. The non-transitory computer-readable medium of claim 15, where the one or more instructions to determine the fee, when executed by the processor, further cause the processor to:

normalize the billing metric; and determine the fee based on the normalized billing metric.

18. The non-transitory computer-readable medium of claim 15, where the one or more instructions to determine the billing metric, when executed by the processor, further cause the processor to:

filter the resource utilization data to determine the quantity of data and the amount of network resources utilized by the machine-to-machine device.

19. The non-transitory computer-readable medium of claim 15, where the resource utilization data includes information identifying an amount of time that a connection between the machine-to-machine device and a base station was maintained during the particular period of time, and where the one or more instructions to determine the billing metric, when executed by the processor, further cause the processor to:

determine the billing metric further based on the amount of time that the connection between the machine-to-machine device and the base station was maintained during the particular period of time.

20. The non-transitory computer-readable medium of claim 19, where the one or more instructions to determine the billing metric, when executed by the processor, further cause the processor to:

divide the amount of time by the quantity of data to determine the billing metric.

* * * * *